W. J. KEENE & G. W. SCHUSTER.
HINGE AND SUPPORTING BOX FLANGE.
APPLICATION FILED JAN. 13, 1908.
919,726.
Patented Apr. 27, 1909.
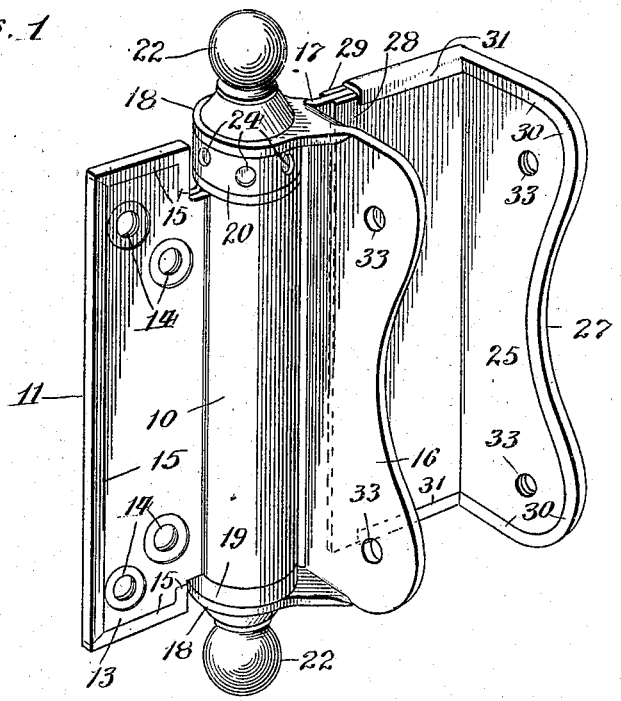
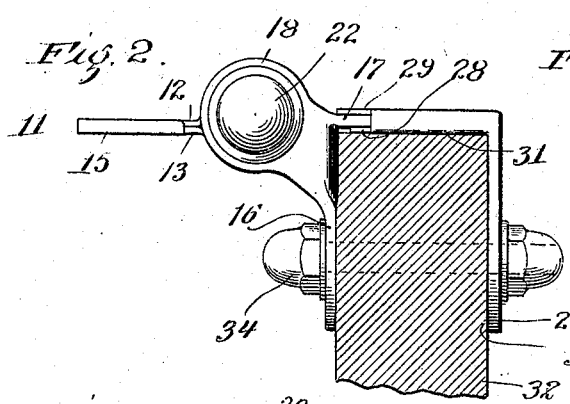
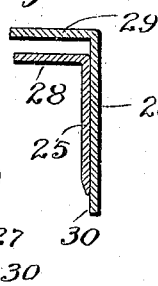
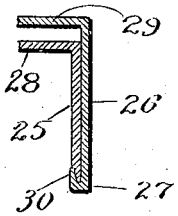
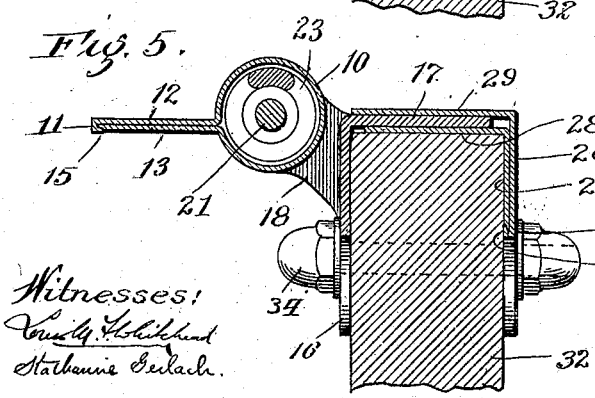
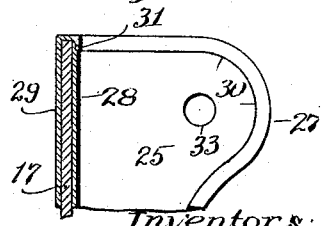

UNITED STATES PATENT OFFICE.

WILLIAM JAMES KEENE AND GEORGE W. SCHUSTER, OF CHICAGO, ILLINOIS, ASSIGNORS TO CHICAGO SPRING BUTT COMPANY, OF CHICAGO, ILLINOIS, A CORPORATION.

HINGE AND SUPPORTING BOX-FLANGE.

No. 919,726.           Specification of Letters Patent.       Patented April 27, 1909.

Application filed January 13, 1908. Serial No. 410,529.

*To all whom it may concern:*

Be it known that we, WILLIAM JAMES KEENE and GEORGE W. SCHUSTER, citizens of the United States, and residents of Chicago, county of Cook, and State of Illinois, have invented certain new and useful Improvements in Hinges and Supporting Box-Flanges, of which the following is a specification.

The invention relates to hinges, and more particularly to spring hinges, having a U-shaped wing or "box flange" such as are employed for the doors of water-closets, lavatories and the like, for connecting the door to the edge of the marble or slate partition.

The invention seeks to provide a simple and strong hinge of this type and an improved form of adjustable box flange, which may be economically manufactured from sheet metal and in which the box flange or U-shaped wing is formed of two sections that are relatively adjustable to fit slabs or partitions of different thicknesses.

The invention consists in the features of construction, combinations and arrangements of parts hereinafter set forth, illustrated in the accompanying drawings and more particularly pointed out in the appended claims.

In the drawings, Figure 1 is a perspective view of the improved hinge. Fig. 2 is a plan view of the improved hinge shown attached to the edge of the marble slab or partition. Figs. 3 and 4 are detail sections illustrating the manner in which the adjustable section of the box flange or U-shaped wing is constructed. Fig. 5 is a cross section of the improved hinge. Fig. 6 is a detail section of the box flange or U-shaped wing.

The barrel 10 of the hinge is constructed of sheet metal and is provided with an integral, flat wing 11. These parts are constructed of a single, suitably shaped blank, the central portion of which is shaped to form the barrel 10 and the end portions of which are arranged in contact to form the two thicknesses or sections 12 and 13 of the wing 11 that projects laterally from the barrel 10.

The wing 11 is provided with openings 14 for the screws by which the hinge or the hinge leaf 11 is secured to the door. Sheet metal hinge barrels having an integral wing of two thicknesses or sections of metal have heretofore been used but in such constructions the two sections of the wing have usually been connected by rivets. It is of course necessary to have openings or holes in the wing for the fastening screws, but where such rivets are employed the additional holes therefor necessarily further weaken the metal body of the wing. In the present improved construction the two sections or thicknesses 12 and 13 of the wing 11 are connected along the outer side edge and at the end edges of the wing by crimping the edges of one section over the edges of and into engagement with the outer face of the other section. For example, in the form shown, the wing section 12 is made slightly larger than the wing section 13 and has an integral edge portion or flange 15 that is lapped over the outer side edge and end edges of the section 13 and into engagement with the outer face thereof to firmly unite the two sections of the wing, thus avoiding the use of connecting rivets. To further insure a good union between the two sections 12 and 13 of the wing, these sections are preferably somewhat longer than the barrel 10, as clearly indicated in Fig. 1, so that they project beyond the ends of the barrel, and the inner side edges of the wing sections that projects beyond the ends of the barrel, are united in a similar manner by the overlapping flange 15.

The U-shaped wing or "box flange" is formed of two sections, each of which comprises a flange and an end portion at right angles to the flange. The flanges of the U-shaped wing engage the opposite side faces of the marble slab or partition wall, and the end portions adjustably connecting the two flanges of the wing. The section of the U-shaped wing adjacent the barrel 10 is formed of a single blank of sheet metal, that is bent to an L-shape to form the flange 16 and the end portion 17 at right angles to each other. This wing section is provided, at its upper and lower corners with outwardly bent, integral ears 18 that extend over the ends of the barrel 10 and engage the bearing sleeves 19 and 20 that are fitted into the ends of the barrel. The usual connecting pintle 21 extending through these parts is provided with the end caps or nuts 22 that engage the outer faces of the ears 18. A spring 23 coiled about the pintle 21 is connected as usual at its opposite ends to the bearing sleeves 19 and 20. The bearing sleeve 19 is fixed to the barrel 10 and to the wing 11 while the bearing sleeve 20 is rotatable within the barrel and is adapted to be adjustably connected to the U-shaped wing by a pin extending through one of a series of holes 24 therein. The outer or adjustable section of the U-shaped wing or box flange is formed from two separate blanks that are both bent to an L-shape and arranged one within the other. The side walls 25 and 26 of these L-shaped pieces are arranged in contact to form the wing flange 27 while the end portions 28 and 29 of the L-shaped pieces are spaced apart to adjustably receive the end portion 17 of the other section of the wing. The blank from which the outer L-shaped piece is formed is preferably somewhat larger than that from which the inner L-shaped piece is constructed and the edges of the outer side wall 26 and the upper and lower edges of the end wall 29 are crimped over the corresponding edges of the inner side and end walls 25 and 28 respectively and into engagement with the inner faces thereof to firmly unite the two L-shaped pieces that form the adjustable section of the U-shaped wing or box flange. In constructing this section of the wing the side walls 25 and 26 are placed in contact and a die piece of proper size is inserted between the end walls 28 and 29 to hold them apart. The edge portion or integral flange 30 of the side wall 26 is then lapped over the edge portion of the inner side wall 25 and into engagement with the inner face thereof and the upper and lower edge portions or flanges 31 of the outer end wall 29 are similarly lapped over the corresponding edge portion of the inner end wall 28. The end portion 17 of the wing section that is connected to the hinge barrel snugly fits between the end walls 28 and 29 of the adjustable wing section and between the end flanges 31 so that the flanges 16 and 27 are securely held in parallel relation but may be adjusted to and from each other to fit the edges of marble slabs or like partition walls of different thicknesses.

In connecting the two L-shaped pieces of the adjustable wing section, the edges of the inner piece over which the flanges 30 and 31 are folded, are preferably first beveled, as indicated in Fig. 3, and when the flanges 30 and 31 are folded over the beveled edges, the overlapping portions are flattened or swaged down, as shown in Figs. 4 and 6, so as to be of substantially the same thickness as the main body of the adjustable section; that is to say, so that the flange 27 and the end portion formed of the walls 28 and 29 will each be of substantially uniform thickness so that the inner faces will be flush and will snugly engage the sides and edge of the partition 32 against which they abut, as indicated in Figs. 2 and 5. Preferably also the two pieces forming the adjustable wing section are formed of relatively thin metal. In the form shown, they are formed of metal of about one-half the thickness of that from which the flange 16 and end portion 17 of the other section are formed. In this way, the flange 27 will be of substantially the same thickness as the flange 16 and the end portion of the U-shaped wing or box flange will only be twice as thick as either of its flanges and will neatly and snugly fit upon the marble slab or partition 32. At the same time the two pieces forming the adjustable wing section will be firmly secured together by the overlapping flanges 30 and 31 without necessitating the use of rivets, the holes for which necessarily weaken the metal. The U-shaped wing of the hinge will then be of strong construction and at the same time readily adapted to fit marble slabs or the like of different thicknesses. This adjustability of the sections of the U-shaped wing is not only a convenience in placing the hinges in position but reduces the cost of manufacture, since otherwise a large number of tools would be necessary for manufacturing hinges of different sizes. Moreover, on the same piece of work, where the marble slabs or the like are supposed to be of the same thickness, they in fact, frequently vary. But in any event, the adjustable sections of the U-shaped wing or box flange will snugly and neatly set in position.

It is obvious that the improved adjustable box flange, while particularly designed for use in connection with the hinge set forth, may be employed to support other fixtures, such as door-stops or the like, upon the edges of marble, slate or like partitions.

It should be noted that the overlapped edge portion or flange 15 of the flat wing 11 is swaged down or flattened in the same way as are the flanges 30 and 31 of the adjustable section of the U-shaped wing, so that the wing 11 will be of substantially the same thickness throughout. The flattening or swaging down of the overlapped edges or flanges 15, 30 and 31 not only assists in giving a neat appearance to the hinge, but also more firmly interlocks and unites the parts which are connected in this way, and enables the parts to fit snugly upon the partition wall and door. The flanges 16 and 27 are provided with holes 33 for the fastening bolts 34 by which the hinge is secured to the marble slab or partition 32.

It is obvious that numerous changes may be made in the details set forth without departure from the essentials of the invention as defined in the claims.

Having described our invention, what we claim as new and desire to secure by Letters Patent, is:—

1. An adjustable box flange or U-shaped support for hinges and the like formed of two sections, each comprising a flange and an end portion, one of said sections being formed of two connected L-shaped pieces, the end walls of which are spaced apart to adjustably receive the end portion of the other section.

2. An adjustable box flange or U-shaped support for hinges and the like formed of two sections, each comprising an end portion and a flange, one of said sections being formed of two L-shaped pieces connected along their edges by an overlapping portion and having their end walls spaced apart to adjustably receive the end portion of the other section.

3. An adjustable box-flange or U-shaped support for hinges and the like formed of two sheet-metal sections, each section comprising an end portion and a flange at right angles to each other, one of said sections being formed of two L-shaped pieces of relatively thin metal having their side walls in contact to form a flange and their end walls spaced apart to adjustably receive the end portion of the other section, said L-shaped pieces being united along their edges by a portion integral with one of said pieces and overlapping the edges of the other, the overlapped edges of said adjustable section being flattened and of substantially the same thicknesses as the main body thereof.

4. An adjustable box flange or U-shaped support for hinges and the like formed of two sections, each comprising an end portion and a flange at right angles to each other, one of said sections being formed of two L-shaped pieces connected by a portion integral with one of the pieces and overlapping the edges of the other, the end walls of said pieces being spaced apart to adjustably receive the end portion of the other section.

5. An adjustable box flange or U-shaped support for hinges and the like formed of two sections, each comprising an end portion and a flange at right angles to each other, one of said sections being formed of two L-shaped pieces having their side walls in contact to form the flange and their end walls spaced apart to adjustably receive the end portion of the other section, said pieces being united along the edges of the flange and at the top and bottom of their end walls by a portion integral with one of said pieces and overlapping the edge of the other.

6. A hinge having a U-shaped wing formed of two sheet metal sections each comprising an end portion and a flange at right angles to each other, one of said sections having ears laterally projecting from the upper and lower corners thereof, and the other section being formed of two L-shaped pieces of relatively thin metal having their side walls in contact to form the flange and their end walls spaced apart to adjustably receive the end portion of the other section, said L-shaped pieces being united along the edges of the flange and at the top and bottom edges of their end walls by a portion integral with the outer one of said pieces and overlapping the edge of the inner piece, the overlapped edges of said adjustable section being flattened and of substantially the same thickness as the main body thereof.

7. A hinge barrel formed of sheet metal and having two integral, overlapping sections in contact forming a projecting wing, the sections of said wing being united along the outer side edge and at the end edges of said wing by a flange integral with one of said sections and folded over and interlocked with the edges of the other.

8. A hinge barrel formed of sheet metal and having two integral, overlapping sections in contact forming a projecting wing, the sections of said wing being united along the outer side edge and at the end edges of the wing by a flange integral with one of said sections and folded over and interlocked with the edges of the other, the overlapped edges of said wing being flattened and of substantially the same thickness as the main body thereof.

9. A hinge barrel formed of sheet metal and having two integral overlapping sections in contact forming a projecting wing, the sections of said wing extending beyond the ends of said barrel and united along the outer side edge and end edges of the wing and at the inner side edge thereof beyond the ends of the barrel by a flange integral with one of said sections and folded over and interlocked with the edges of the other.

10. A spring hinge having a U-shaped wing and a spring barrel formed of sheet metal, said wing comprising two sections, one of which is L-shaped and provided with projecting ears extending over the ends of said barrel, a connecting pintle extending through said ears and said barrel, the other section of said wing being formed of two L-shaped pieces having their end walls spaced apart to adjustably receive the end portion of the barrel-engaging section, said barrel having two integral, projecting sections in contact with each other and forming a flat wing, the sections of said flat wing and the pieces of the adjustable section of said U-shaped wing being united at their edges by flanges integral with one section or piece and folded over and interlocked with the edges of the other.

11. A hinge having a barrel and a U-shaped wing or box flange formed of sheet metal, said wing or box flange comprising two sections having an end portion and a flange at right angles to each other, one of said sections having latterly bent ears projecting from the upper and lower corners thereof over the ends of said barrel, a connecting pintle extending through said ears and said barrel, the other section of said wing or box flange being formed of two L-shaped pieces having their side walls in contact and their end walls spaced apart to adjustably receive the end portion of the barrel-engaging section, the pieces of the adjustable section of said U-shaped wing being united at their edges by flanges integral with one of the pieces and folded over and interlocked with the edges of the other.

WM. JAMES KEENE.
GEORGE W. SCHUSTER.

Witnesses:
EDWARD KEENE,
H. R. LUTHER.